United States Patent [19]

Schapker

[11] 3,833,115

[45] Sept. 3, 1974

[54] CLINICAL PROBE AND DISPOSABLE SHEATH

[76] Inventor: Richard L. Schapker, 134 Farnum St., North Andover, Mass. 01845

[22] Filed: June 15, 1973

[21] Appl. No.: 370,480

Related U.S. Application Data

[63] Continuation of Ser. No. 228,990, Feb. 24, 1972, abandoned.

[52] U.S. Cl............. 206/306, 73/362 AR, 128/2 H
[51] Int. Cl. ........................ B65d 85/38, G01k 7/00
[58] Field of Search... 73/362 AR; 206/46 ST, 16.5, 206/63.2 R; 338/28; 128/2 H

[56] References Cited
UNITED STATES PATENTS

| | | | |
|---|---|---|---|
| 3,301,394 | 1/1967 | Baermann et al. | 206/63.2 R |
| 3,469,685 | 9/1969 | Baermann | 206/16.5 X |
| 3,500,280 | 3/1970 | Ensign | 206/16.5 UX |
| 3,650,153 | 3/1972 | Schwab | 206/16.5 X |
| 3,673,868 | 7/1972 | Beury et al. | 73/362 AR |
| 3,729,998 | 5/1973 | Mueller et al. | 73/362 AR |
| 3,738,173 | 6/1973 | Sato | 73/362 AR |

*Primary Examiner*—William I. Price
*Assistant Examiner*—Steven E. Lipman

[57] ABSTRACT

Disposable sheath in combination with a clinical probe, the sheath, comprising a frame defining an aperture large enough to admit the probe and an elastic membrane fixed to the frame and covering the aperture, so that upon a forceable insertion of the probe through the aperture the membrane will stretch by at least 100 percent along the probe axis to conform to the probe surface to be sheathed. The probe includes inner spring-biased retainers that hold the sheath on the probe by said frame, with a movable actuator that ejects the sheath from the probe upon actuation.

1 Claim, 6 Drawing Figures

PATENTED SEP 3 1974 3,833,115
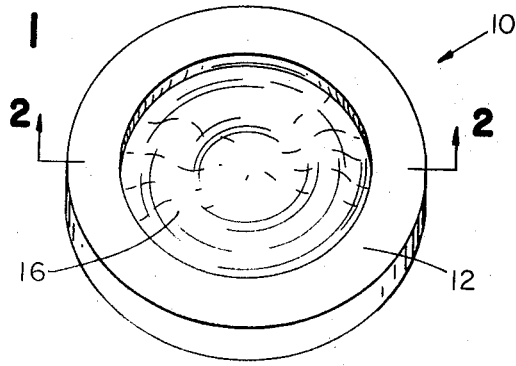
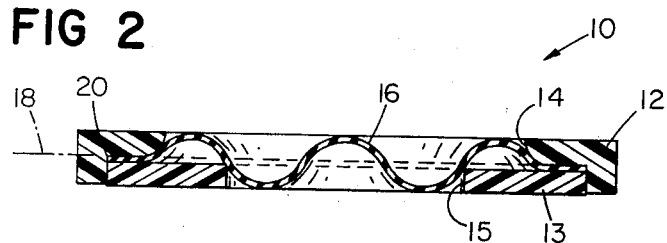
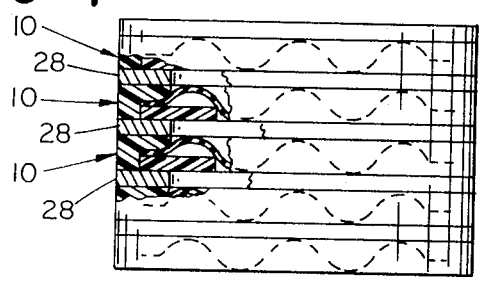
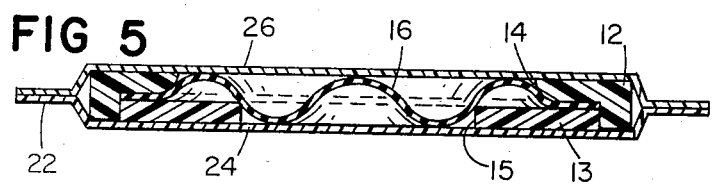
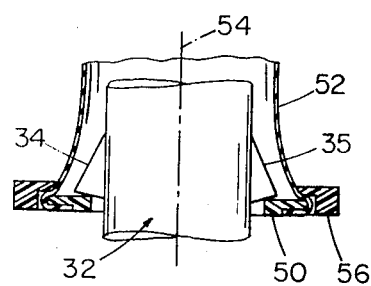
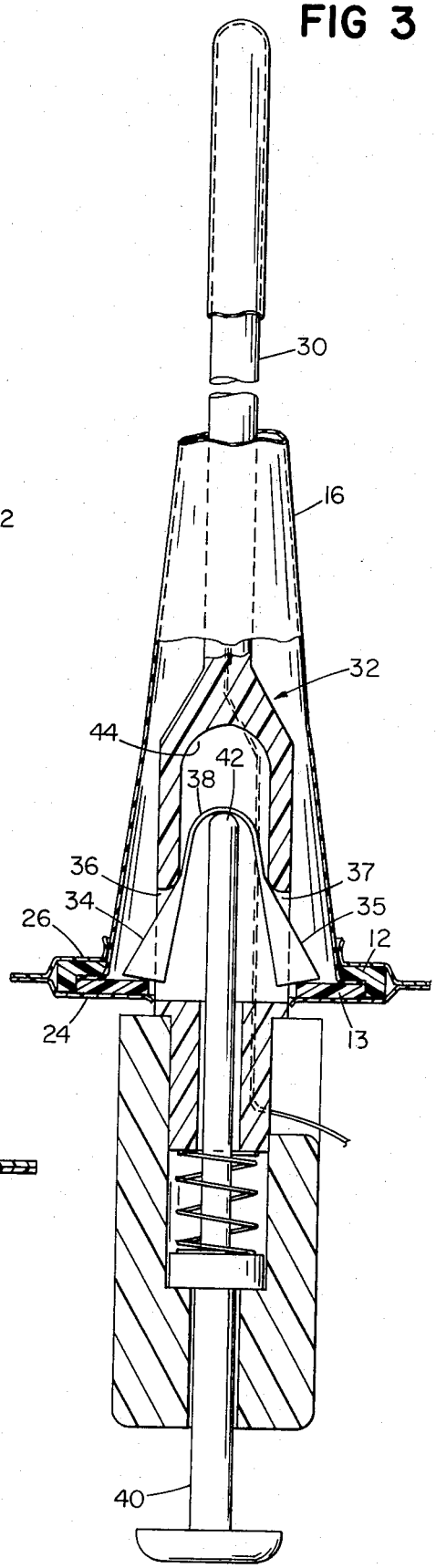

3,833,115

CLINICAL PROBE AND DISPOSABLE SHEATH

This is a continuation of application Ser. No. 228,990, filed Feb. 24, 1972, now abandoned.

BACKGROUND OF THE INVENTION

1. Field of the Invention

This invention relates to disposable sheaths for probes (e.g., clinical thermometers).

2. Description of the Prior Art

Sheaths have been employed on clinical thermometers to avoid the necessity of sterilizing the thermometer itself after each use. To maintain proper heat conductivity it is important that the sheath conform closely to the outer surface of the thermometer probe. U.S. Pat. No. 738,960 shows a tubular rubber shield which is rolled onto the thermometer. Similar tubular shields, individually wrapped in domed, puncturable packages, are shown in U.S. Pat. Nos. 3,469,685 and 3,301,394.

SUMMARY OF THE INVENTION

The present invention provides a sheath which can easily be supplied in a sterile, compact package (e.g., easily dispensed from a cartridge-like dispenser), can be applied to and removed from the probe with simple handling movements which avoid contamination of either the sheath (upon application) or the handler (upon removal), and which conforms tightly to the probe surface when in place (e.g., without air entrapment).

In general the invention features a disposable sheath comprising a frame defining an aperture large enough to admit the probe, and an elastic membrane fixed to the frame and covering the aperture, so that upon forceable insertion of the probe through the aperture the membrane will stretch by at least 400% along the probe axis to conform to the probe surface to be sheathed. In preferred embodiments the frame has sufficient strength and rigidity to hold the membrane stretched on the probe and to enable the storage of energy in the stretched membrane sufficient to automatically dismount the sheath from the probe upon release of the frame; the membrane is of rubber or other highly stretchable material such that it can be distended at least four times its unstretched length, and is preformed to extend without stretching to no more than the largest dimension of the frame from the plane of the periphery of the membrane; the aperture is circular and the membrane is stretchable to at least three inches from the mentioned plane; the frame comprises two layers between which the membrane is sandwiched; resilient retaining means are in the probe to hold the frame in its fixed position; and the sheath is wrapped in an individual flat package having its major surface opposite the side of probe insertion, planar and parallel to the plane of the aperture, the package being puncturable by the probe upon the insertion.

Other advantages and features of the invention will be apparent from the description and drawings herein of a preferred embodiment thereof.

BRIEF DESCRIPTION OF THE DRAWINGS

FIG. 1 is an isometric view of a sheath embodying the invention;

FIG. 2 is a sectional view taken along 2—2 of FIG. 1;

FIG. 3 is a sectional view of the sheath mounted on a thermometer probe;

FIG. 4 is an elevational view showing a stack of sheaths interleaved with germicidally impregnated sheets for sterilization;

FIG. 5 is a view similar to FIG. 2, showing the sheath in an individual wrapper; and FIG. 6 is a sectional view of another embodiment of the invention.

DESCRIPTION OF THE PREFERRED EMBODIMENT

Referring to the drawings, sheath 10 consists of a rigid frame having a base 12 in which is snap fitted a washer 13, each of, e.g., 1/32 inch thick plastic. Base 12 has a central aperture 14 (preferably a ¾ inch diameter circle), and washer 13 has a smaller (e.g., ½ inch diameter) opening 15. Between the washer and base is attached a thin, rubber-like membrane 16. The membrane is preferably of very thin rubber material, but must in any event have a high capacity for stretching. An alternative would be a highly stretchable plastic film. Preferably the membrane is capable of elongation to at least four times its relaxed length, and is preformed to extend without stretching to no more than the diameter of frame 12 from the plane 18 (FIG. 2) of the membrane periphery 20.

As shown in FIG. 5 each sheath may be wrapped, sterilized, in its own flat envelope 22. The major surfaces 24, 26 of the envelope are planar parallel to the plane of aperture 14 (enabling compact storage), and are of a material which can be easily punctured by the probe to be sheathed. Alternatively, surface 24, unnecessary for sterilization, may be omitted.

In FIG. 4 a stack of sheaths is shown interleaved with sheets 28 of, e.g., paper impregnated with a germicide, for sterilization.

In use (treating the individually wrapped form as an example), 3 inch long stem 30 of, e.g., clinical thermometer probe 32 is inserted through wrapper surface 24 as the sheath is manually drawn onto the stem by grasping frame base 12. The stem distends membrane 16, forces it through wrapper surface 26, stretching the membrane along the stem axis, and causes it to conform to the outer stem surface. The frame is drawn up to and snapped past wedge shaped retainers 34, 35 which protrude through slots 36, 37 in the stem wall and are joined inside the probe by U-shaped spring 38. Retainers 34, 35 snap under washer 13, under the biasing force of spring 38, and hold the frame in position on the stem. The then highly stretched membrane fits very snugly on the stem, without air entrapment, providing a very thin sheath with excellent thermal conductivity.

The energy stored in the stretched membrane provides for convenient removal of the sheath after use. Spring biased plunger 40 is depressed, forcing plunger tip 42 against spring 38 and pressing the spring into stem cavity 44. Retainers 34, 35 are thus retracted into slots 36, 37, to release washer 13 and allow the sheath to rapidly retract and fly off the stem.

The degree to which membrane 16 is pre-formed must of course be adjusted to accommodate the elasticity of the membrane to the length of stem 30. However, the advantages of the invention cannot be obtained unless the operative portion of the membrane undergoes at least 400 percent elongation along the stem axis upon installation on the probe.

While the material of frame base 12 and washer 13 can vary, the resulting frame structure must be strong enough to withstand the elastic forces of the membrane and retain the sheath installed on the probe.

FIG. 6 shows an alternate configuration in which frame 50 is a simple rigid washer, and membrane 52 is stretched laterally of its axis 54 to fit over the washer. Alternately, the membrane can be attached to the washer by a molding-type process in which the washer forms part of the mold. A mounting holder 56, shaped similarly to element 12 of FIG. 2, may be used to temporarily hold the washer for installation on the probe.

I claim:
1. The combination of a probe and a disposable sheath therefor, wherein
 said probe has a longitudinal axis and comprises a plurality of spring-biased sheath retainers, and a retainer actuator movable along said axis,
 said actuator has a portion arranged to cause camming of said retainers toward said axis upon movement of said actuator along said axis,
 said sheath comprises a frame defining an aperture large enough to admit said probe and to allow said retainers to pass when they are cammed toward said axis, and an elastic membrane fixed to said frame and covering said aperture, so that upon forceable insertion of said probe through said aperture said membrane will assume a condition in which it is stretched along said axis and conformed to the probe surface to be sheathed,
 said aperture is small enough to prevent passage of said retainers when they are not cammed toward said axis, and
 said frame has sufficient strength and rigidity so that, when said frame is held in a fixed position on said probe by said retainers, said membrane can in turn be retained on said probe in said stretched and conformed condition solely by said frame.

* * * * *